UNITED STATES PATENT OFFICE.

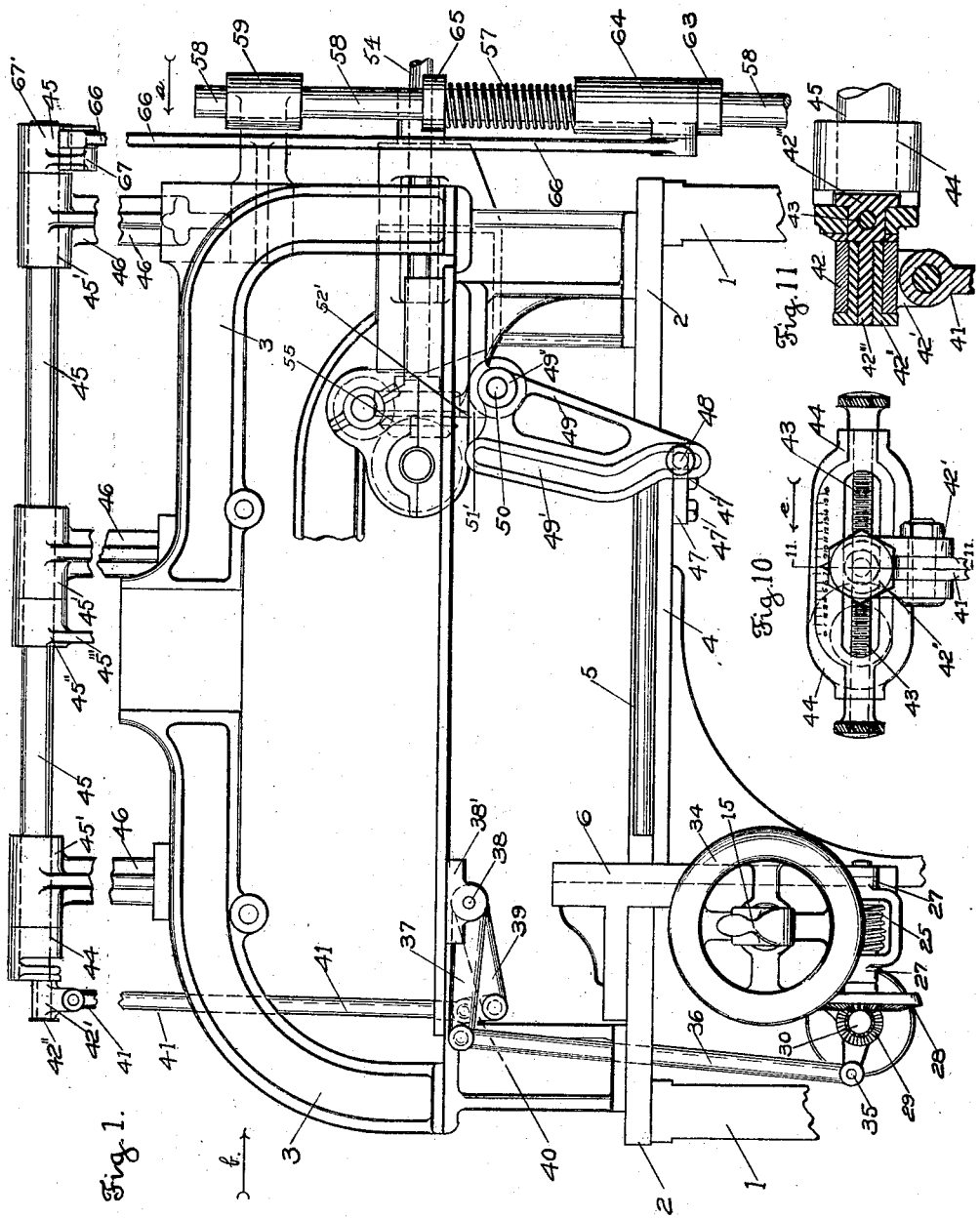

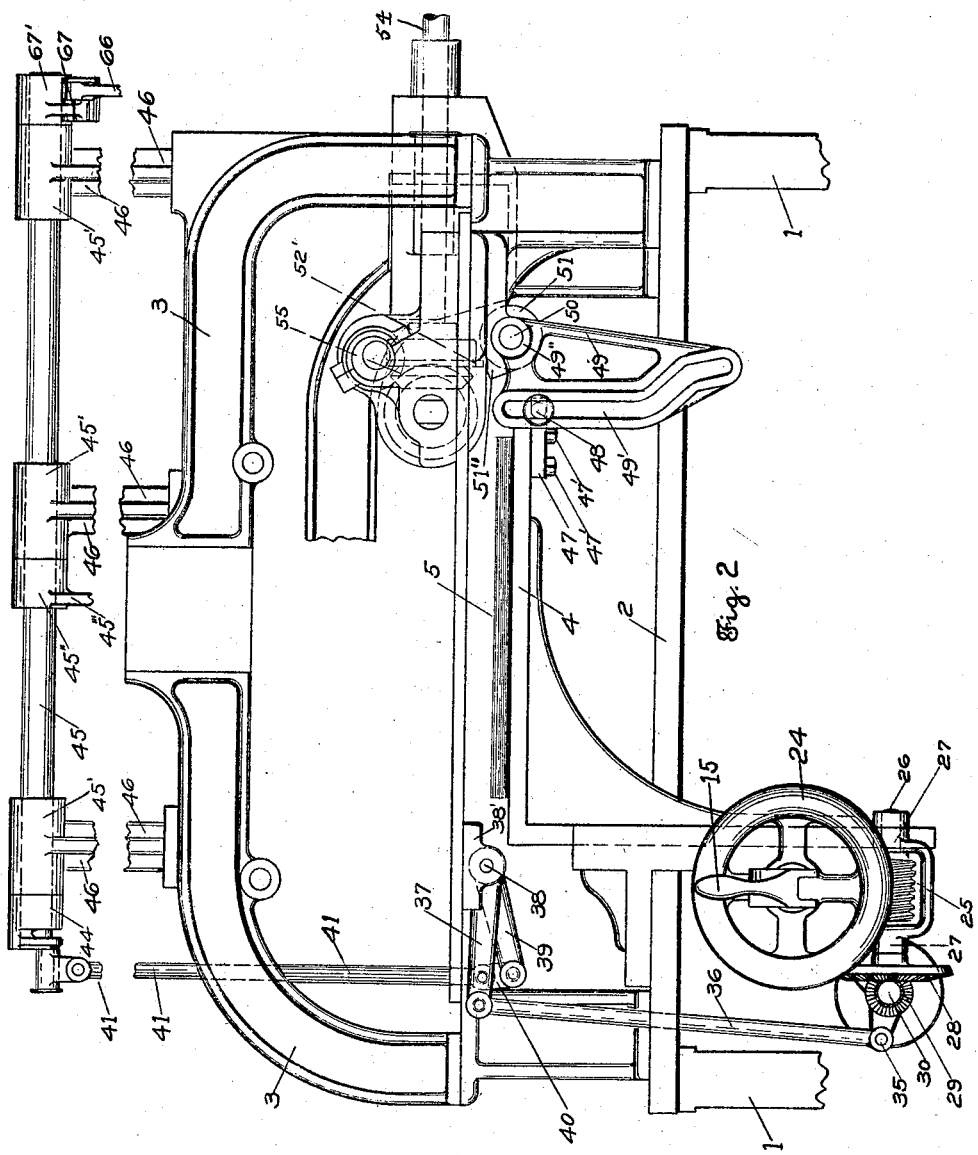

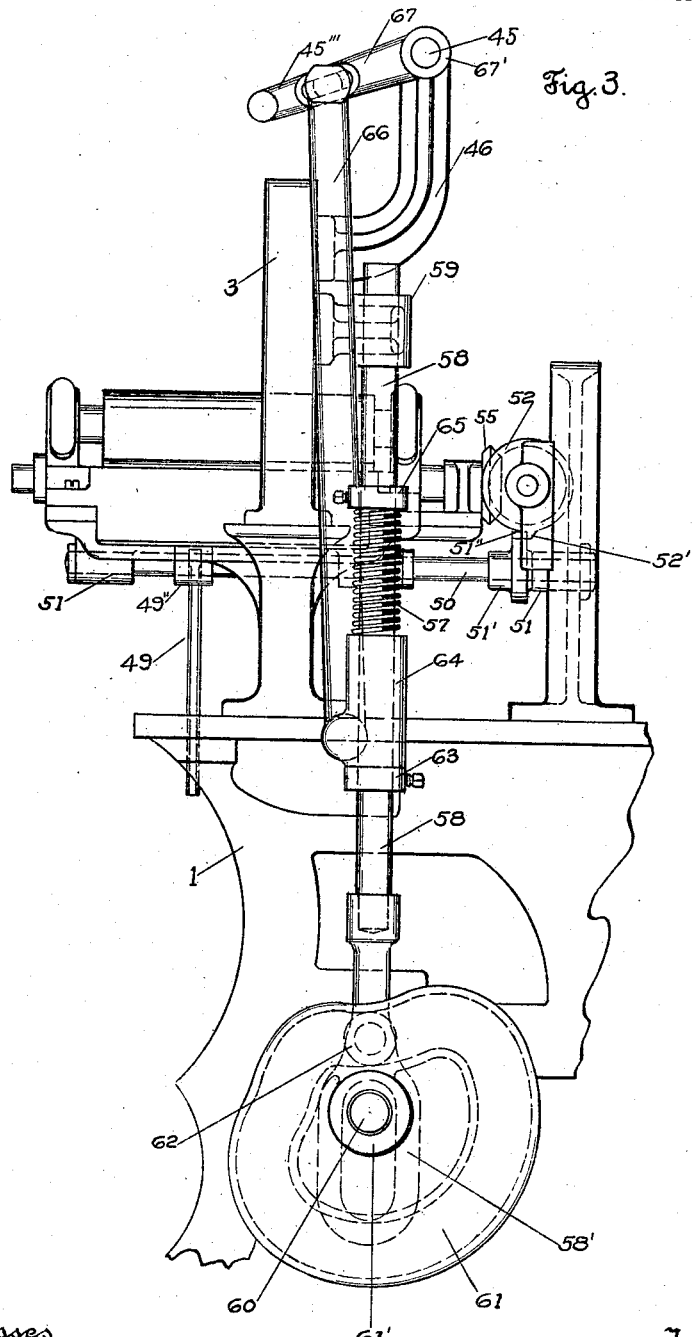

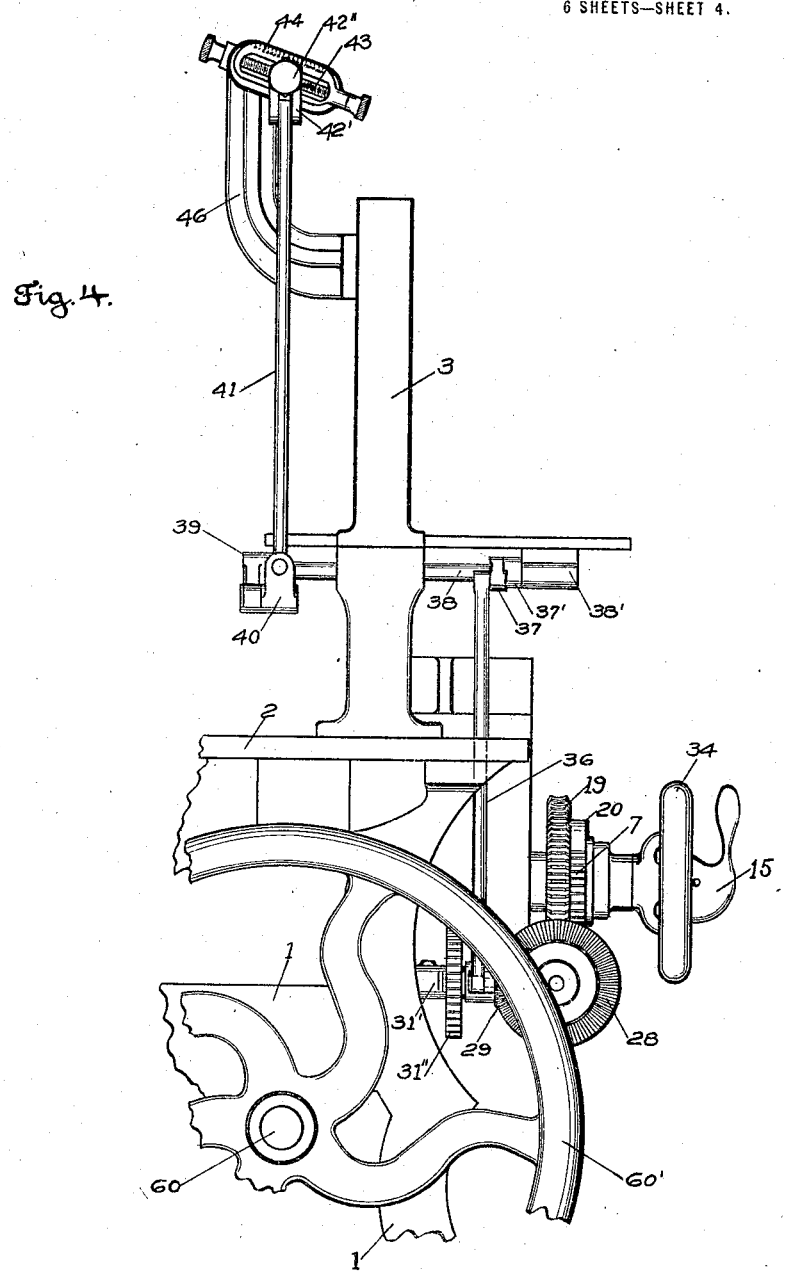

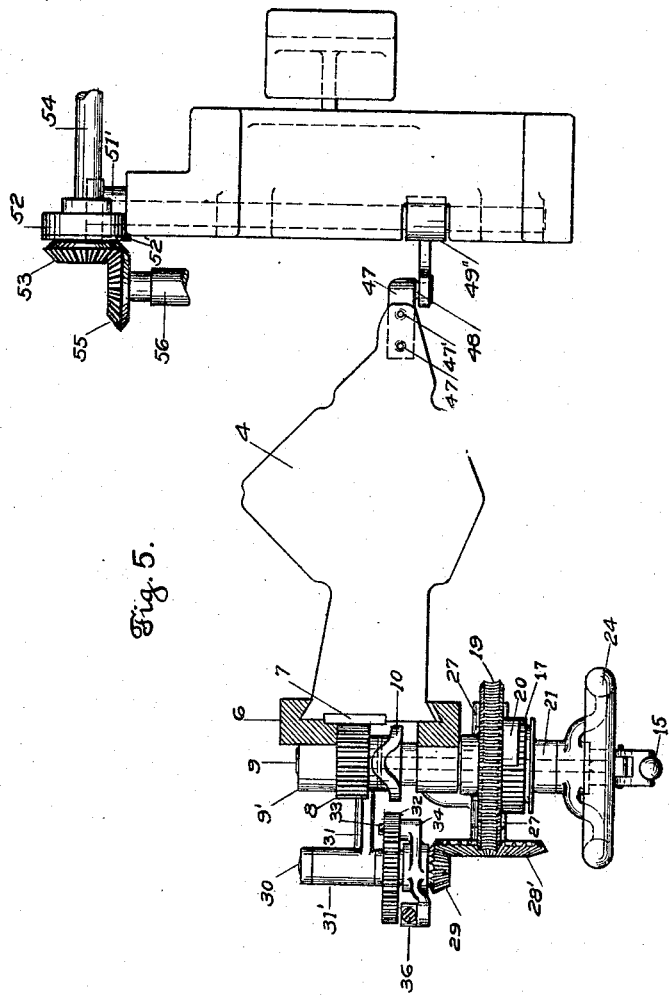

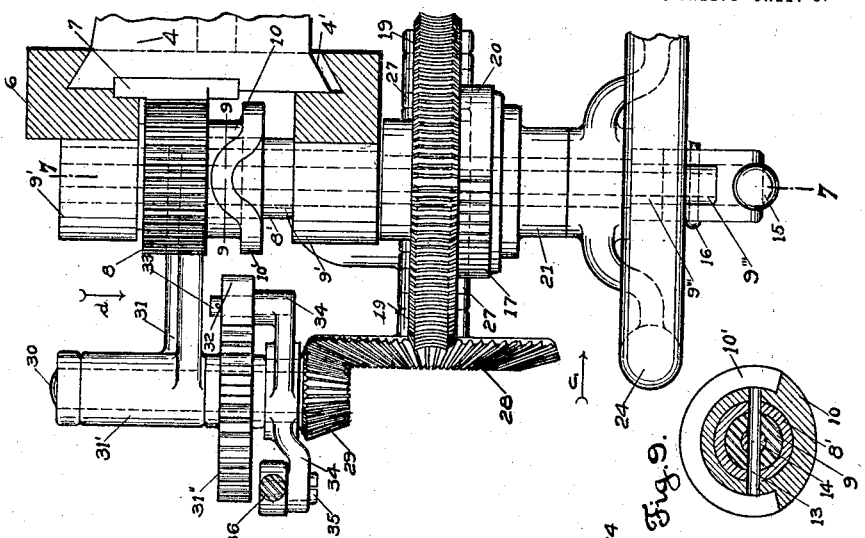
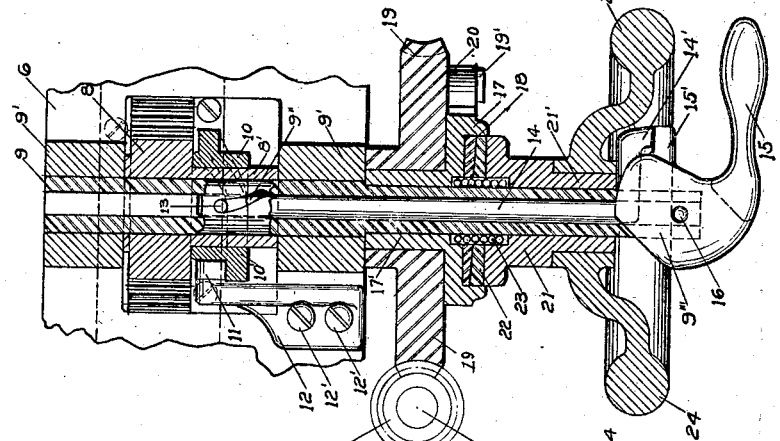
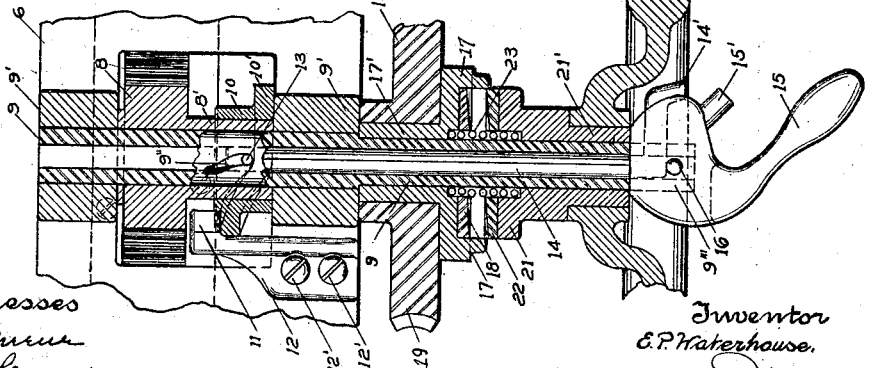

EZRA P. WATERHOUSE, OF WORCESTER, MASSACHUSETTS, ASSIGNOR OF ONE-HALF TO WORCESTER ENVELOPE COMPANY, OF WORCESTER, MASSACHUSETTS, A CORPORATION OF MASSACHUSETTS.

ENVELOP-MACHINE.

1,271,250.  Specification of Letters Patent.  Patented July 2, 1918.

Application filed December 19, 1914. Serial No. 878,125.

*To all whom it may concern:*

Be it known that I, EZRA P. WATERHOUSE, a citizen of the United States, residing at Worcester, in the county of Worcester and State of Massachusetts, have invented certain new and useful Improvements in Envelop-Machines, of which the following is a specification.

My invention relates to envelop machines, and my invention particularly relates to the envelop picker mechanism, which operates to pick up an envelop blank preparatory to its being gummed, and to the paper feed mechanism, which operates to raise or feed the envelop blanks, which are carried on a table or plate which has a vertical up and down movement, to the pickers, preparatory to being gummed and transferred to the folding box, to be folded in the usual and well known way.

The object of my invention is to improve upon the construction of the mechanisms above referred to, as ordinarily made, and to do away with the feeler mechanism ordinarily used for the envelop blanks, and to operate the picker mechanism, and the paper feed mechanism, by a single cam, and through one rock shaft, and to combine with the mechanism, through which said shaft is operated, a spring, said spring acting to allow for any variation in the thickness of the blank sheets on the paper feed table.

A further object of my invention is to combine with the paper feed mechanism, mechanism to automatically release the paper feed table, when it reaches its highest position in raising the blanks, and allow said table to drop to its lowest position to receive additional blanks, and simultaneously operate mechanism to cause the gum box roll to discontinue its rotary motion, while the blank feed table is in its lowest position, and to continue its rotary motion on the raising of the blank feed table.

In my improved construction of the paper feed mechanism above referred to, the table, carrying the blanks, when dropped to its lowest position, preparatory to receiving new blanks, automatically puts the gum box roll out of operation, and when said table is moved up it automatically causes the gum box roll to be put into operation, all as will be hereinafter fully described.

My invention consists in certain novel features of construction of my improvements as will be hereinafter fully described.

I have shown in the drawings detached parts of an envelop machine with my improvements combined therewith.

Referring to the drawings:—

Figure 1 is a front view of a part of the stand and the frame of an envelop machine, and of a paper feed table, and some other parts, with my improvements combined therewith; the paper feed table is shown in its lowered position.

Fig. 2 corresponds to Fig. 1, but shows the paper feed table in its raised position; some of the parts shown at the right in Fig. 1 are not shown in this figure.

Fig. 3 is an end view of the parts shown in Fig. 1, looking in the direction of arrow *a*, same figure; some parts are shown in this figure which are not shown in Fig. 1.

Fig. 4 is an end view of the parts shown in Fig. 1, looking in the direction of arrow *b*, same figure; some parts are shown in this figure which are not shown in Fig. 1.

Fig. 5 is a plan view of the paper feed table, and parts connected therewith, shown in Fig. 1, detached.

Fig. 6 shows, on an enlarged scale, the parts shown at the left in Fig. 5.

Fig. 7 is a central longitudinal section, on line 7, 7, Fig. 6, looking in the direction of arrow *c*, same figure.

Fig. 8 corresponds to Fig. 7, but shows some of the parts in a different position.

Fig. 9 is a cross section, on line 9, 9, Fig. 6, looking in the direction of arrow *d*, same figure.

Fig. 10, shows, on an enlarged scale, the graduated adjusting crank for the paper feed table, shown at the upper part in Fig. 4, and, Fig. 11 is a section, on line 11, 11, Fig. 10, looking in the direction of arrow *e*, same figure.

In the accompanying drawings, 1 is a part of the frame of an envelop machine, which is shown broken away, and is permanently attached to the floor; 2 is the top or table of the machine, 3 is the arch or frame work of the machine, which is secured to the top or table 2, and on which are supported the several parts of the envelop machine, in the usual and well known way.

4 is the paper or envelop blank feed table, which carries the envelop blanks 5, and which has a vertical up and down movement; the upward movement raising the blanks, preparatary to the top blank being engaged by the pickers and raised from the pile of blanks, to be transferred to the folding mechanism.

The blank feed table 4 is guided and has a vertical up and down movement in a vertically extending plate or way 6, secured to the table 2, in the usual way. A gib 4' extends in a recess in the plate 6, see Fig. 6. A rack bar 7 is secured at its upper end to one end of the table 4, Fig. 1, and is in mesh with and operated by a pinion 8, Fig. 6, which is fast on a tubular shaft 9, Fig. 7, which shaft is mounted in bearings 9' secured to the upright plate 6.

On an extension 8' on the hub of the pinion 8, Fig. 6, is mounted a cam 10, to revolve with, and have a sliding motion on said hub extension 8' in the direction of the length thereof. The cam 10 has a cam projection 10' on its periphery, which extends in the path of and is adapted to be engaged by a roll 11, mounted on a stand 12, secured in this instance by screws 12' to the vertically extending plate 6, Figs. 7 and 8. The hub extension 8' of the pinion 8 has a curved or cam shape slot therethrough, and the tubular shaft 9 also has a curved or cam shaped slot 9" therethrough, see Figs. 7 and 8.

A pin 13 is secured to a longitudinally sliding rod 14, which extends loosely within the tubular shaft 9. The pin 13 projects outwardly in opposite directions from said rod 14, and extends loosely through the curved or cam shaped slot in opposite sides of the tubular shaft 9, and in opposite sides of the hub extension 8' on the pinion 8, and into the cam 10, as shown in Fig. 9, and acts to secure the longitudinally moving rod 14 to the cam 10, so that the movement of the cam 10, on the hub extension 8' of the pinion 8, in the direction of the length of said extension, through the engagement of the roll 11 with the cam surface 10' on said cam 10, will cause the longitudinal movement of the rod 14. The rod 14 extends loosely within the tubular shaft 9, to have a longitudinal movement therein, and through the pin 13, is caused to rotate with said tubular shaft. The outer end of the rod 14 is bent at an angle, as shown at 14', Figs. 7 and 8, and its projecting end is adapted to engage a lug 15' on a handle 15. The handle 15 has a forked end, which is pivotally mounted, through a pin 16, on the reduced outer end 9''' of the tubular shaft 9, and said handle 15 has a curved or cam shaped engaging surface.

On the tubular shaft 9 is loosely mounted the hub 17' of the ratchet wheel 17. Within a recess in the face of the ratchet wheel 17 is a toothed surface or disk 18, forming one member of a clutch. On the extended hub 17' of the ratchet 17 is loosely mounted a worm gear 19. The worm gear 19 carries on its outer side or face, on a pin 19', a pawl 20, which is adapted to engage with the teeth of and turn the ratchet 17, and through said ratchet, when it is secured to the tubular shaft 9, turn said tubular shaft and the pinion 8, to move the rack bar 7, which operates the feed table 4.

On the tubular shaft 9 is a collar 21, which is mounted on said shaft to have a longitudinal motion thereon, and to rotate with said shaft by means of a spline, not shown, or otherwise. The collar 21 has a friction or toothed disk 22 secured on its inner side or face, which forms a second member of the clutch, and is adapted to be moved into and out of mesh with the toothed surface 18 on the ratchet wheel 17, see Figs. 7 and 8.

A helically coiled expansion spring 23 encircles the tubular shaft 9, and extends within a recess in the ratchet wheel 17, and in the collar 21, and on the outward movement of the rod 14 and the handle 15, as shown in Fig. 8, acts to move apart the clutch surfaces 18, and 22, as shown in Fig. 8, to leave the ratchet wheel 17 and worm gear 19 loose on the tubular shaft 9, to allow said ratchet wheel and gear to rotate without rotating said shaft, and at the same time to allow said shaft and the pinion 8 thereon to rotate, to allow the rack bar 7 to move down and carry the feed table 4 to its lowest position automatically. While the clutch mechanism is in this position, the paper table 4 may be raised or lowered at will, independent of said clutch mechanism.

A hand wheel 24 is fast on the hub extension 21' of the clutch collar 21, and when the clutch collar 21 is clutched to the ratchet wheel 17, as shown in Fig. 7, the tubular shaft 9 may be turned by said hand wheel 24, to cause the rotation of the pinion 8 fast on said tubular shaft, and also cause the up and down movement of the rack bar 7 and the feed table 4 secured thereto, as desired.

The worm gear 19 has a rotary movement communicated thereto, to cause, through the engagement of the pawl 20 with the ratchet wheel 17, rotary movement of said ratchet wheel, and also of the tubular shaft 9, and through intermediate connections the movement of the feed table 4, by a worm pinion 25, see Fig. 2, fast on a shaft 26, mounted in suitable bearings 27. The shaft 26 has fast on one end a bevel gear 28, which meshes with the bevel pinion 29 fast on a stud shaft 30, see Fig. 6, which is mounted in a bearing 31', on the end of an arm 31, secured to a stationary part of the machine.

On the shaft 30 is fast a ratchet wheel 31'', which is operated by a pawl 32, mounted on a pin 33, secured on one end of an arm 34, which has its hub loosely mounted on the shaft 30. On the other end of the arm 34 is a stud 35, which is pivotally connected to the lower end of a connector 36, see Fig. 1. The upper end of the connector 36 is pivotally connected to one end of an arm 37. The opposite end of the arm 37 has a hub 37', see Fig. 4, which is fast on a shaft 38, mounted in suitable bearings 38' on a part of the frame, see Fig. 4. On the opposite end of the shaft 38 is secured the arm 39, see Fig. 1, said arm 39 being pivotally connected by a link 40, with the lower end of a connector or rod 41. The upper end of the connector 41 is pivotally connected, in this instance, with the forked end 42' on a collar 42 mounted on a threaded bushing 42'', see Fig. 11, which is mounted on a binder screw 42''', through which extends an adjusting screw 43, see Fig. 10. The adjusting screw 43 is mounted to have a rotary movement in a loop shaped crank arm 44, to cause the bushing 42'' to move in one direction or the other on the screw 43, to regulate the amount of movement of the paper feed table 4, through intermediate connections.

The loop shaped crank arm 44 is secured at one end on one end of a shaft 45, mounted in suitable bearings 45' on the upper end of arms 46, secured to the upper part or arch of the frame of the machine. On the shaft 45 is secured the hub 45'' of an arm 45''', the outer end of which is connected with a link, which in turn is connected with the vertically moving plunger, carrying at its lower end flap gumming dies, which apply the gum to the envelop flaps, and also act as pickers to raise the envelop blanks, preparatory to the same being carried to the folding mechanism, all in the usual and well known way.

I have not shown herein the vertically moving plunger, carrying the gumming dies, and connected with and operated through the arm 45''', as the same form no part of my present improvements, and may be of any usual and well known construction, for example of the construction shown in U. S. Letters Patent No. 1,161,829, of November 30, 1915.

Through the rocking motion of the shaft 45, and intermediate connections above described, to the worm gear 19, carrying the pawl 20, a step by step rotary motion is communicated to the ratchet wheel 17, and to the tubular shaft 9, carrying the pinion 8, which meshes with the rack 7, to cause the raising or lowering of the feed table 4, through the rack 7.

I will now describe the mechanism, intermediate the blank feed table and the gumming mechanism, to cause the automatic stopping of the gum box roll, and also the starting of the gum box roll, at predetermined times.

In this instance, on the underside of the paper feed table 4, on the end thereof opposite the supported end of the table, is secured, by bolts 47', a plate 47. The plate 47 carries a roll 48, which in this instance extends through a cam shaped slot 49' in an arm 49, which has a hub 49'' fast on a shaft 50, mounted in suitable bearings 51 on a stationary part of the machine, see Fig. 3.

Fast on the shaft 50, to which is communicated a rocking movement, through the movement of the cam arm 49, on the raising and lowering of the blank feed table 4, is a hub 51', on which is a projection 51'', see Fig. 3, which, when the envelop blank feed table 4 is dropped and the shaft 50 rocked, through the movement of the cam arm 49, comes into the path of and engages a projection 52' on a clutch member 52, to release said clutch, thereby allowing the bevel gear 53, which is loosely mounted on the driven shaft 54 of the gum box mechanism, to run free, see Fig. 5. The bevel gear 53 meshes with the bevel gear 55 on the gum box roll 56.

On the dropping of the envelop blank feed table 4, from its raised position to its lowered position, as shown in Fig. 1, the cam arm 49 will be moved, from the position shown in Fig. 2 to the position shown in Fig. 1, and through the rocking of the shaft 50, will cause the clutch member 52 to operate the clutch which secures the bevel gear 53 to the driven shaft 54, to release said bevel gear and leave it loose on said shaft, and consequently stop the operation of the bevel gear 55, and the rotary motion of the gum box roll 56, automatically. The gum box roll 56 will remain stationary while the blank feed table 4 is in its lowered position, but immediately on the upward movement of the blank feed table 4, the cam 49 will be operated, and cause the clutch member to operate to attach the bevel gear 53 to the driven shaft 54, and cause the rotary motion of the gum box roll 56.

In my improvements I provide a helically coiled expansion spring to allow for any variation in the thickness of the blank sheets on the paper feed table. In this instance I combine a helically coiled expansion spring 57 with the vertically moving upright rod 58, see Figs. 1 and 3, which rod is guided at its upper end in a bearing 59 attached to the frame of the machine, and has an elongated loop or opening 58' at its lower end, see Fig. 3, through which extends the driven cam shaft 60, on which is secured the hub 61' of the cam 61. The cam shaft 60 has the hand wheel 60' fast thereon, see Fig. 4. The cam 61 has a cam track therein, into which extends, in this instance, a roll 62 on the upright rod 58. On the rod 58 is fast a collar 63 on which rests a sleeve 64. A second collar 65 is also fast on the upright rod 58, and the helically coiled expansion spring 57 extends between the collar 65 and the upper end of the movable sleeve 64, see Figs. 1 and 3. The sleeve 64 carries a stud, on which is pivotally mounted the lower end of a connector 66; the upper end of said connector 66 is pivotally attached to an arm 67, having its hub 67' fast on the shaft 45, see Figs. 1 and 3.

The rotation of the cam 61 causes the up and down movement of the upright rod 58, and through the sleeve 64, mounted on said rod, the movement of the connector rod 66 and the arm 67, and the shaft 45.

By means of the spring 57, intermediate the sleeve 64 and the collar 65 fast on the upright rod 58, any variation in the thickness of the blank sheets of paper on the feed table is provided for, through the compression of said spring, and also the expansion of said spring.

From the above description in connection with the drawings the operation of my improvements will be readily understood by those skilled in the art.

In operating the machine, the blank feed table 4, preparatory to receiving a pile of blanks 5, is dropped or moved down to its lowered position, which is done automatically, or by the operator by moving outwardly the handle 15, as shown in Fig. 8, and causing the moving apart of the two members 18 and 22 of the clutch mechanism, and leaving the tubular shaft 9 free to be turned in either direction, and then, by turning the hand wheel 24, rotating the tubular shaft 9 and the pinion 8 fast thereon, which, engaging with the rack bar 7, moves the envelop blank feed table 4 up or down. After the feed table 4 is moved to its lowest position, and the pile of blanks placed thereon, it may then be moved to the desired height, preparatory to the feeding of a blank to the pickers, by turning the hand wheel 24, and then the handle 15 is pushed inwardly, as shown in Fig. 7, which causes the inward movement of the collar 21 and the clutch member 22 through the engagement of the cam surface on the attached end of the handle 15 with the end of the collar 21, to cause the clutch member 22 to engage the clutch member 18, to attach the same to the tubular shaft 9, so that the feed table 4 will be automatically moved upwardly, to feed the blanks 5 to the gumming dies, not shown, through the operation of the cam shaft 60, see Figs. 1 and 3, and intermediate connections to the rack bar 7.

The turning of the adjusting screw 43, in one direction or the other, will move the threaded bushing 42, to vary the amount of movement of the pawl 32, which operates the ratchet wheel 31'', and through the rotation of said wheel, the amount of rotation of the worm gear 19, the ratchet wheel 17, the tubular shaft 9, and the pinion 8, which operates the rack bar 7 on the feed table 4.

The contraction and expansion of the helically coiled expansion spring 57, allows for any variation of the thickness of the blank sheets.

When, in the continued operation of the machine, the table 4, carrying the blanks 5, reaches its highest position, the roll 48, traveling in the cam slot 49' in the arm 49, from the position shown in Fig. 1 to the position shown in Fig. 2, moves the arm 49, and through intermediate connections above described, operates the clutch mechanism, to release the gear 53, Fig. 5, which drives the gum box roll 56, leaving said gear 53 free on its shaft, and consequently stopping the movement of the gum box roll 56. At the same time, through the engagement of the cam surface 10' on the cam 10, with the roll 11, said cam 10 revolving with the gear 8, and so located on the hub 8' of said gear, and with the cam surface 10' so shaped as to cause its engagement with said roll 11 when the blank feed table 4 reaches its highest position, the cam 10 is moved outwardly, and with it the pin 13, through which it is attached to the rod 14, and also the rod 14 carrying said pin, said pin moving in the cam shaped slot in the tubular shaft 9, and in the hub 8' of the pinion 8. The outward movement of the cam 10 and the rod 14, causes the engagement of the outer end 14' of said rod 14 with the lug 15' on the handle 15, which causes the outward movement of said handle on its pivot 16, as shown in Fig. 8, and allows the spring 23 to move apart the clutch members 18 and 22, as shown in Fig. 8, and leave the ratchet wheel 17 and gear 19 free to turn on the tubular shaft 9, and allow the tubular shaft to rotate with the pinion 8, so that the rack bar 7, and the feed table 4 may drop down to their lowest position automatically.

After the pile of blanks are placed on the feed table, the handle 15 is pushed inwardly, to clutch the two clutch members 18 and 22, and attach the hand wheel 24 to the tubular shaft 9, and also to clutch the ratchet wheel 17 to said shaft; the feed table is then ready to be raised as above described.

It will be understood that the details of construction of my improvements may be varied if desired.

Having thus described my invention, what I claim as new and desire to secure by Letters Patent is:

1. In an envelop machine, the combination with a single rock shaft, of a single driven cam, and connections intermediate said cam and said shaft, to cause the operation, through said shaft, of both the envelop picker mechanism, and the paper feed mechanism by said cam.

2. In an envelop machine, the combination with a single rock shaft, of a single driven cam, and connections intermediate said cam and said shaft, said connections including a yielding spring, to cause the operation, through said spring and shaft, of the paper feed mechanism, and allow for any variation in the thickness of the blank sheets on the paper feed table of the paper feed mechanism.

3. In an envelop machine, the combination with a single rock shaft, of a single driven cam, and connections intermediate said cam and said rock shaft, said connections including a yielding spring, through which spring a rocking motion is communicated to said shaft from said cam, to allow for any variation in the thickness of the blank sheets on the paper feed table of the paper feed mechanism.

4. In an envelop machine, the combination with a rock shaft for operating, through intermediate connections, the paper feed mechanism, of a driven cam, and connections intermediate said cam and said rock shaft, said connections including a yielding spring, through which spring a rocking motion is communicated to said shaft from said cam, to allow for any variation in the thickness of the blank sheets on the paper feed table of the paper feed mechanism.

5. In an envelop machine, the combination with the envelop blank feed table, means for raising and lowering said table, and means to automatically release said feed table when it reaches its highest position, and allow it to drop to its lowest position, of the gum box roll of the gumming mechanism, and means, intermediate said gum box roll and said paper feed table, to cause the gum box roll to automatically discontinue its rotary motion while said feed table is in its lowered position, and to continue its rotary motion on the raising of said feed table.

6. In an envelop machine, the combination with the envelop blank feed table, a rack bar connected with said table for raising and lowering the same, of means for raising and lowering said rack bar, said means comprising a pinion, a tubular shaft carrying said pinion, which pinion has an extension on its hub having a curved or cam shaped slot therein, a cam mounted to rotate with and have a sliding motion on said extension, and means for sliding said cam, a rod extending within said shaft and having a longitudinal motion therein, a pin on said rod, extending through said curved or cam shaped slot, and secured to said cam, a ratchet wheel loose on said tubular shaft, and means for rotating said ratchet wheel, a clutch member connected with said ratchet wheel, a collar mounted on said shaft and adapted to rotate therewith, and have a longitudinal motion thereon, a clutch member on said collar, adapted to engage with the clutch member on said ratchet wheel, a spring interposed between said clutch members, said members adapted to be automatically disengaged upon the longitudinal movement of said rod, to allow the rotary motion of said tubular shaft and pinion, independent of said ratchet wheel, and the lowering of the blank feed table.

7. In an envelop machine, the combination with the envelop blank feed table, and a rack bar connected with said table, for raising and lowering the same, of means for raising and lowering said rack bar, said means comprising a pinion, a tubular shaft carrying said pinion, which pinion has an extension on its hub having a curved or cam shaped slot therein, a cam mounted to rotate with and have a sliding motion on said extension, and means for moving said cam, a rod extending within said shaft, and having a longitudinal motion therein, and a pin on said rod, extending through said curved or cam shaped slot, and secured to said cam, a ratchet wheel loose on said tubular shaft, and means for rotating said ratchet wheel, a clutch member connected with said ratchet wheel, a collar mounted on said shaft and adapted to rotate therewith and have a longitudinal motion thereon, a clutch member on said collar, adapted to engage with the clutch member on said ratchet wheel, a spring interposed between said clutch members, said members adapted to be automatically disengaged upon the longitudinal movement of said rod, to allow the rotary motion of said tubular shaft and said pinion, independent of said ratchet wheel, and the lowering of the blank feed table, and means for moving the clutch members into engagement with each other, to cause the rotary movement of said ratchet wheel, to rotate said tubular shaft and pinion.

EZRA P. WATERHOUSE.

Witnesses:
JOHN C. DEWEY,
MINNA HAAS.

Copies of this patent may be obtained for five cents each, by addressing the "Commissioner of Patents, Washington, D. C."